Sept. 18, 1923.

W. R. WOODS

UNIVERSAL JOINT

Original Filed Sept. 12, 1919

1,468,188

Witnesses:
C. E. Wessels
B. J. Richards

Inventor:
Walter R. Woods,
By Joshua R. H. Potts
Attorney.

Patented Sept. 18, 1923.

1,468,188

UNITED STATES PATENT OFFICE.

WALTER R. WOODS, OF CHICAGO, ILLINOIS, ASSIGNOR, BY MESNE ASSIGNMENTS, TO WILLIAM MUTSCHLER, TRUSTEE, OF GOSHEN, INDIANA.

UNIVERSAL JOINT.

Application filed September 12, 1919, Serial No. 323,318. Renewed February 7, 1923.

*To all whom it may concern:*

Be it known that I, WALTER R. WOODS, a citizen of the United States, and a resident of the city of Chicago, county of Cook, and State of Illinois, have invented certain new and useful Improvements in Universal Joints, of which the following is a specification.

My invention relates to improvements in universal joints for power shafts of power driven vehicles, such as automobiles, motor cycles, and the like, and has for its object the provision of an improved construction of this character arranged and adapted to prevent sudden jars and shocks in the application of the power.

Other objects will appear hereinafter.

The invention consists in the combinations and arrangements of parts hereinafter described and claimed.

Figure 1:
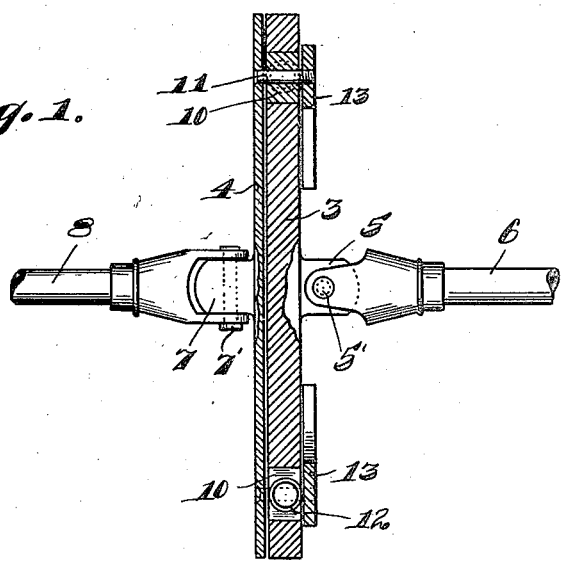

The invention will be best understood by reference to the accompanying drawings forming a part of this specification, and in which, Fig. 1 is a vertical section of a construction embodying the invention.

Figure 2:
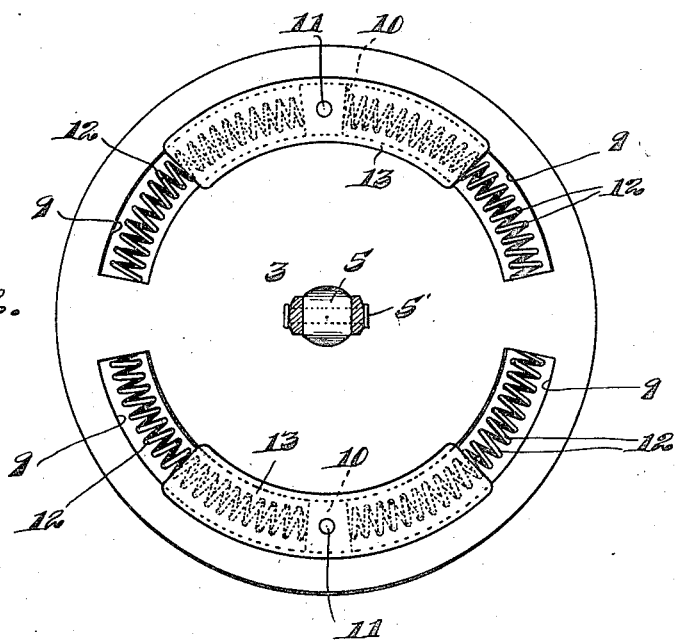

Fig. 2 is a face view of the same.

The preferred form of construction, as illustrated in the drawings, comprises two disks 3 and 4, arranged co-axially and facing each other, the disk 3 being much thicker and heavier than the disk 4. The disk 3 is provided co-axially on its outer side with a perforated securing lug 5, to which a section of the power shaft 6 is pivotally connected by means of a pin 5'. Likewise the disk 4 is provided with a co-axial projection 7 to which the shaft section 8 is pivotally connected by means of the pin 7', said pins 5' and 7' being arranged at right angles to each other, as shown, so as to effect a universal joint connection between the shaft sections 6 and 8. The disk 3 is provided with two oppositely disposed segmental slots 9 adjacent the periphery thereof, and disk 4 carries two stops or blocks 10 positioned substantially centrally in the slots 9 and arranged to slide angularly therein, as shown. The blocks 10 are secured in place by machine screws 11, and compression springs 12 are imprisoned in each slot 9 on each side of the corresponding block 10, thus torsionally resisting the movements of said blocks. Segmental guard plates 13 are also secured to the blocks 10 on the side of disk 3 opposite to the disk 4 to insure imprisonment of springs 12 during their operation. By this arrangement, it will be observed that, upon application of power to one of the shaft sections, said power will be transmitted to the other shaft section through the medium of the springs 12, thus effecting a torsionally yielding connection between said shafts, which tends to lessen the shocks and jars incident to the application of power, as in automobiles, motor cycles, and the like, and tending to increase the smoothness with which such vehicles may be operated, and also tending to minimize the danger of stripping the gears of the transmission therein.

While I have illustrated and described the preferred form of construction for carrying my invention into effect this is capable of variation and modification without departing from the spirit of the invention. I therefore, do not wish to be limited to the precise details of the construction set forth, but desire to avail myself of such variations and modifications as come within the scope of the appended claims.

Having described my invention, what I claim as new and desire to secure by Letters Patent is:

1. A universal joint for power shafts comprising two universal joint members arranged adjacent each other; perforated lugs on the outer sides of said members, the perforations in said lugs being at substantially right angles to each other; shaft sections pivotally connected with said lugs; and a torsionally yielding connection between said members, substantially as described.

2. A universal joint for power shafts comprising two universal joint members arranged adjacent each other; perforated lugs on the outer sides of said members, the perforations in said lugs being at substantially right angles to each other; shaft sections pivotally connected with said lugs; and a torsionally yielding spring connection between said members, substantially as described.

3. A universal joint for power shafts comprising two disks arranged facing each other, one of said disks being provided with two oppositely arranged segmental slots; stops on the other disk operating in said slots; springs resisting movements of said stops in said slots; and shaft sections pivotally connected with said disks, substantially as described.

4. A universal joint for power shafts of power driven vehicles, comprising two disks arranged facing each other, one of said disks being provided with two oppositely arranged segmental slots; stops on the other disk positioned substantially centrally in said slots and arranged to swing circumferentially therein; compression springs positioned in said slots on opposite sides of said stops; perforated lugs on the outer sides of said disks, the perforations in said lugs being at substantially right angles to each other; and shaft sections pivotally connected with said lugs by means of pins extending through said perforations, substantially as described.

In testimony whereof I have signed my name to this specification in the presence of two subscribing witnesses.

WALTER R. WOODS.

Witnesses:
JOSHUA R. H. POTTS,
LAURA J. ERICKSON.